No. 767,242. PATENTED AUG. 9, 1904.
F. REICHLE, JR.
WHEEL FENDER.
APPLICATION FILED MAR. 7, 1904.
NO MODEL.
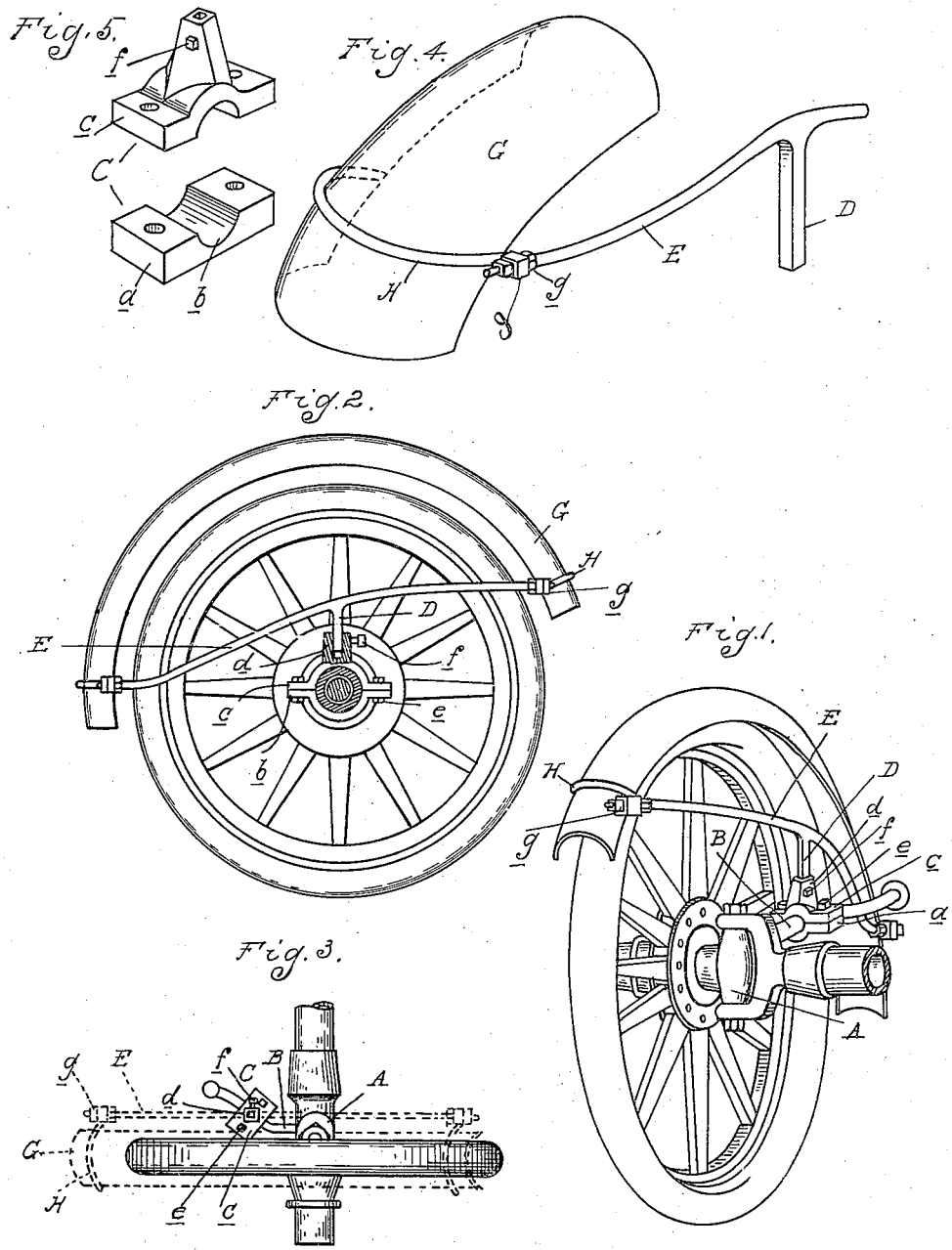

No. 767,242. Patented August 9, 1904.

UNITED STATES PATENT OFFICE.

FERDINAND REICHLE, JR., OF DETROIT, MICHIGAN.

WHEEL-FENDER.

SPECIFICATION forming part of Letters Patent No. 767,242, dated August 9, 1904.

Application filed March 7, 1904. Serial No. 197,006. (No model.)

*To all whom it may concern:*

Be it known that I, FERDINAND REICHLE, Jr., a citizen of the United States, residing at Detroit, in the county of Wayne and State of Michigan, have invented certain new and useful Improvements in Wheel-Fenders, of which the following is a specification, reference being had therein to the accompanying drawings.

The invention relates to wheel-fenders, and particularly to a guard of this character especially designed for use in connection with automobiles.

The invention consists in the novel construction of the fender; further, in the peculiar manner of application of the fender to the vehicle, and, still further, in the novel arrangement and combination of its parts, as will be more fully hereinafter set forth.

In the drawings illustrating my invention, Figure 1 is a perspective view showing my improved fender applied to the steering-knuckle of an automobile. Fig. 2 is a view in side elevation, partly in section, of the fender applied to the rear axle of a motor-car. Fig. 3 is a plan view of the structure shown in Fig. 1. Fig. 4 is a sectional enlarged perspective view of the guard and guard-holder, and Fig. 5 is a perspective view of the securing-clip.

In the drawings thus briefly described the reference-letter A represents a steering-knuckle for a motor-car of ordinary construction, to the arm B of which I secure the clip C of my wheel-fender. This clip is formed in two parts, a lower section $a$, having a bearing $b$, and an upper complementary section $c$, carrying integral therewith, as indicated, a vertical socket of polygonal cross-section $d$. The parts of the clip are applied to the steering-knuckle, as shown in Figs. 1 and 3, and are clamped together by suitable bolts $e$.

D represents a shank corresponding in configuration to the cross-section of the vertical socket $d$ and adapted to be engaged within said socket for vertical adjustment. Preferably a set-screw $f$ is employed as the adjusting device, which extends within the wall of the socket, as indicated in Fig. 5, and engages the shank. A laterally-extending guard-support E is carried preferably integral with the shank, the latter depending from a point midway between the support ends, as plainly indicated in Fig. 4. Each end of the guard-support is threaded and carries two nuts $g$.

G represents the guard proper, which may be of any desired form, but preferably of the configuration as illustrated, of a size to merely inclose the tire, and being curved in the ordinary manner. Each end of the guard is strengthened and reinforced by the curved bar H, attached to the fender in any suitable manner. Each of these reinforcing-bars terminates at the inner edge or side of the fender in a tubular bearing I, adapted to receive the extremities of the guard-support. As shown, the support ends project through the bearings, and the parts are held in place by the nuts $g$.

In applying the fender to the wheel the desired height is obtained by an adjustment of the shank D. The necessary curve is then given to the fender to properly embrace the wheel-rim by adjusting the nuts $g$.

In applying the clip to a steering-knuckle the clip-body lies necessarily at an angle relative to the wheel, as shown in Fig. 3. The shank and socket being of polygonal cross-section permit the parts to be fitted in such manner that the guard will be brought properly over the wheel, and the shank will be held against independent rotation. A similar clip may be employed for the rear axle, the difference being that said clip is necessarily of a larger size and has its bearing of greater diameter than will be necessary for the steering-knuckle. By employing the two types of clip it will be obvious that the same guard could be used for either the front or rear axles.

What I claim as my invention is—

1. A wheel-fender, comprising a securing-clip, a laterally-projecting guard-support, vertically-adjustable connections between the support and clip, the guard, and adjustable connections between the guard ends and the support, adjacent the respective ends of the latter.

2. A wheel-fender, comprising a two-part securing-clip, a vertical socket of polygonal cross-section upon the upper clip member, a polygonal shank slidingly engaging the socket and adjustable therein, a laterally-projecting guard-support connected intermediate of its ends to the shank, the curved guard, and adjustable connections between the adjoining ends of the guard and support.

3. A wheel-fender, comprising a two-part securing-clip, a vertically-extending socket of polygonal cross-section integral with the upper clip member, a polygonal shank engaging the socket and adjustable vertically therein, a transversely-extending bar supported midway of its ends upon the shank and formed integral with the latter, said bar being threaded at its extremities, a curved guard, a curved reinforce at each end of the guard terminating on the inner side of the latter in a tubular bearing through which the extremities of the transverse bar project, and nuts upon each threaded extremity of said transverse bar engaging upon opposite sides of the bearing.

In testimony whereof I affix my signature in presence of two witnesses.

FERDINAND REICHLE, Jr.

Witnesses:
   Jas. P. Barry,
   H. C. Smith.